No. 872,818. PATENTED DEC. 3, 1907.
C. L. HUTCHESON.
SALT BRICK HOLDER FOR LIVE STOCK.
APPLICATION FILED AUG. 19, 1907.
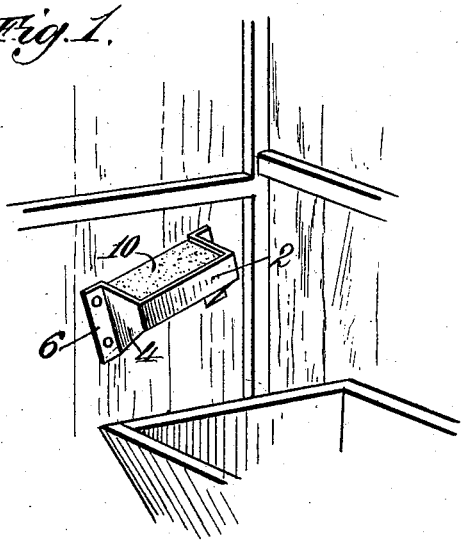
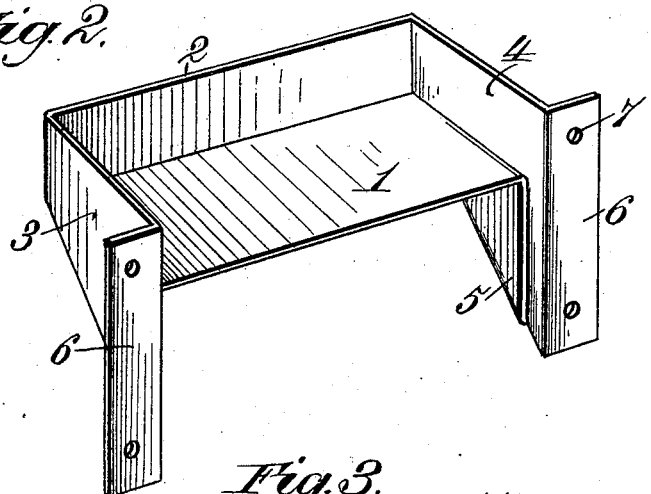
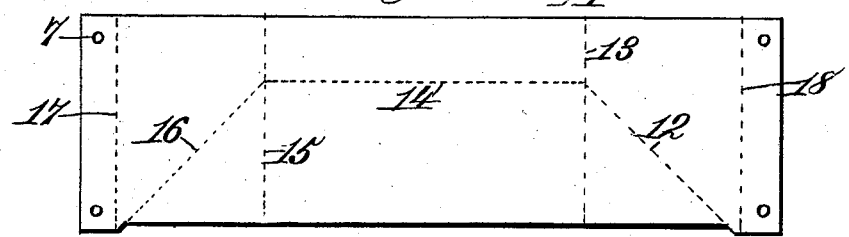
Witnesses.
Inventor.
Caswell L. Hutcheson,
By James L. Norris,
Atty.

UNITED STATES PATENT OFFICE.

CASWELL L. HUTCHESON, OF CHATTANOOGA, TENNESSEE.

SALT-BRICK HOLDER FOR LIVE STOCK.

No. 872,818.      Specification of Letters Patent.      Patented Dec. 3, 1907.

Application filed August 19, 1907. Serial No. 389,258.

*To all whom it may concern:*

Be it known that I, CASWELL L. HUTCHESON, a citizen of the United States, residing at Chattanooga, in the county of Hamilton and State of Tennessee, have invented new and useful Improvements in Salt-Brick Holders for Live Stock, of which the following is a specification.

This invention relates to holders for salt or a medicated salt block or brick which is adapted to be consumed by an animal licking it; and the invention aims to provide a holder of such class in a manner as hereinafter set forth, whereby the block or brick is held stationary and so exposed that the animal may readily reach and consume the same by licking.

A further object of the invention is to provide a holder of such class, in a manner as hereinafter set forth, so as to prevent, when in use, the animal throwing out the entire brick therefrom owing to a lifting or pushing action, and furthermore to enable the securing of the holder in a convenient position in a feed stall, or elsewhere.

The invention further aims to provide a holder for a salt or medicated salt block or brick which shall be simple in its construction, strong, durable, efficient in its use, readily set up in and removed from the feed stall, and inexpensive to manufacture.

With the foregoing and other objects in view, the invention consists in the novel construction, combination and arrangement of parts hereinafter more specifically described and illustrated in the accompanying drawings wherein is shown the preferred embodiment of the invention, but it is to be understood that changes, variations and modifications can be resorted to which come within the scope of the claims hereunto appended.

In describing the invention in detail reference is had to the accompanying drawings, wherein like characters denote corresponding parts throughout the several views, and in which—

Figure 1 is a perspective view of a portion of a feed stall showing a holder in accordance with this invention secured in position therein; Fig. 2 is a perspective view of the holder, and, Fig. 3 shows the blank from which the holder is formed.

A holder in accordance with this invention is formed from suitable material, and by way of example the holder is shown as constructed of a single piece of material. The holder comprises a flat bottom 1, a side wall 2, and a pair of end walls 3, 4, which are reinforced, as at 5, to strengthen the holder, and each of which is furthermore provided with a laterally-extending flange 6 having openings 7 through which are adapted to extend holdfast devices for securing the holder in position.

As a rule the most convenient position for the holder is on the side of the wall of the stall at the right or left of the animal and if it cannot be placed on either of these walls, it can sometimes be placed on the wall in front of the animal. This latter position, however, would not permit of the licking of the brick from end to end but from side to side. The holder can also be secured on the outside of the feed box. By way of example the holder is illustrated as being secured on the wall of a feed stall.

The side wall 2 is of less height than the end walls 3, 4 and terminate in the bottom 1, the latter terminating in the reinforced portions 5 of the end walls 3, 4. The reinforced portions 5 may be formed of an increased thickness in material, but as shown by way of example the reinforced portions 5 are formed by bending the end walls upon themselves. The bottom 1 is of less width than the width of the holder so as to provide a space to allow of the draining from the holder or brick any moisture that might accumulate and to furthermore permit of the insertion of a tool or the hand for the removal of the brick from the holder. This space is formed between the support to which the holder is attached and the edge of the bottom of the holder. Owing to the manner in which the space is formed it overcomes the necessity of cutting away a portion of the holder, consequently obtaining a saving in material. The construction shown obtains a saving in material as it prevents the cutting away to form the drainage space and furthermore enables the support to which the shoulder is attached to constitute the other side wall of the holder.

By way of example a blank of any suitable material is shown to illustrate one method of forming the holder, yet it is evident that a holder can be formed by casting or otherwise.

In Fig. 3 is shown the blank from which the holder is formed and the blank as indicated by the reference character 11, is substantially rectangular in contour, formed at each end with the openings 7 and is adapted to be bent upon the lines 12, 13, 14, 15, 16, 17 and 18. The line 14 extends longitudinally of the blank, the lines 13, 15, 17 and 18 extend vertically, while the lines 12 and 16 extend at an inclination from the terminus of the line 14 to the lower terminus of the lines 17 and 18. The blank is bent upon the lines 13, 15 at right angles with the remaining portion of the blank so as to form the blank substantially U-shaped in contour. The portion of the blank below the lines 14, 12 and 16 is then bent inwardly so as to form the side wall 2, the bottom 1 and the elongated reinforced end walls 3 and 4. The blank is then bent upon the lines 17, 18 so as to form the laterally-extending flanges 16. The reinforced portions 5 of the end walls 3 and 4 constitute a support for the bottom 1.

When the holder is used the flanges 6 are positioned against the wall, feed box or elsewhere, the latter constituting a closure for one side of the holder. Holdfast devices are then inserted through the openings 7 and engage in the wall, thereby securing the holder in position. Preferably when the holder is connected to the wall or elsewhere it extends at an inclination in a manner as shown in Fig. 1 and such manner of positioning the holder with the brick 10 therein allows of the latter to be conveniently licked by the animal.

What I claim is—

1. A brick holder comprising a receptacle having an open top, and a bottom and a side, and end walls, said end walls projecting below and constituting a support for the bottom, that portion of the end walls which projects below the bottom being reinforced, each of said end walls provided with a laterally-extending flange and hold-fast devices extending through the flange for securing the holder in position.

2. A brick holder comprising a receptacle embodying a side wall, a bottom, a pair of end walls, each of said end walls having a laterally-extending flange, said walls, bottom and flanges formed from a unitary strip of material.

3. A brick holder comprising a receptacle embodying a side wall, end walls formed integral with and having an overlapping portion, a bottom formed integral with the side wall and with said overlapping portions, each of said side walls terminating in a laterally-extending flange provided with openings.

4. A brick holder comprising a receptacle embodying a side wall, a pair of end walls formed integral with the side wall and of greater height, each of said end walls bent upon itself, a bottom formed integral with the bent portions of the end walls and with the side wall, said bottom of less width than the width of the end walls.

5. A brick holder comprising a receptacle embodying a side wall, a pair of end walls formed integral with the side wall and of greater height, each of said end walls bent upon itself, a bottom formed integral with the bent portions of the end walls and with the side wall, said bottom of less width than the width of the end walls, each of said end walls provided with a laterally-extending flange.

6. A brick holder comprising a receptacle formed from a single piece of material and embodying a side wall, flanged end walls, and a bottom positioned intermediate the ends of the end walls, said bottom of less width than the width of the receptacle forming thereby a clearance.

7. A brick holder comprising a receptacle embodying a side wall, end walls of greater height than the side wall, and a bottom positioned intermediate the ends of the end walls.

8. A brick holder comprising a receptacle embodying a side wall, end walls of greater height than the side wall, and a bottom positioned intermediate the ends of the end walls, said bottom of less width than the width of the receptacle.

9. A brick holder comprising a receptacle embodying a side wall, reinforced end walls of greater height than the side wall, and a bottom positioned intermediate the ends of the end walls.

10. A brick holder comprising a receptacle embodying a side wall, reinforced end walls of greater height than the side wall, and a bottom positioned intermediate the ends of the end walls, said bottom of less width than the width of the receptacle forming thereby a clearance.

In testimony whereof I have hereunto set my hand in presence of two subscribing witnesses.

CASWELL L. HUTCHESON.

Witnesses:
ROYAL N. LOGAN,
CHARLES COTE.